United States Patent
Fowler et al.

[11] Patent Number: 5,996,234
[45] Date of Patent: Dec. 7, 1999

[54] STRING TRIMMER GUARD

[75] Inventors: Bobby Lee Fowler; Nicholas T. Fokakis, both of Wilmington; Lloyd B. Young, Castle Hayne, all of N.C.

[73] Assignee: Plant Guard, Inc., Wilmington, N.C.

[21] Appl. No.: 09/113,242

[22] Filed: Jul. 10, 1998

[51] Int. Cl.⁶ .................................................. A01G 3/06
[52] U.S. Cl. ................................................ 30/276; 56/12.7
[58] Field of Search ........................... 30/276, 347, 286; 172/13, 14; 56/12.7, 12.5

[56] References Cited

U.S. PATENT DOCUMENTS

| | | |
|---|---|---|
| 4,756,084 | 7/1988 | Morita ........................................ 30/276 |
| 4,756,148 | 7/1988 | Gander et al. . |
| 4,848,846 | 7/1989 | Yamada et al. . |
| 4,872,265 | 10/1989 | Powell . |
| 4,890,389 | 1/1990 | Whitkop . |
| 5,048,187 | 9/1991 | Ryan . |
| 5,060,383 | 10/1991 | Ratkiewich . |
| 5,107,665 | 4/1992 | Wright . |

*Primary Examiner*—Douglas D. Watts
*Attorney, Agent, or Firm*—Rhodes & Mason, PLLC

[57] ABSTRACT

An improved string trimmer guard for attachment to string trimmers having an elongated shaft with a lower section and a rotary cutting head mounted at the lower end of the shaft to carry a string along a circular pathway, the guard adapted to be mounted on the shaft adjacent the cutting head, and including a barrier at the front of the trimmer, a pair of parallel support arms extending rearwardly from the barrier on opposite sides of the shaft, a first clamp attached along the support arms, and a shaft clamp attached to the shaft, the first clamp and shaft clamp being attached to each other.

20 Claims, 3 Drawing Sheets

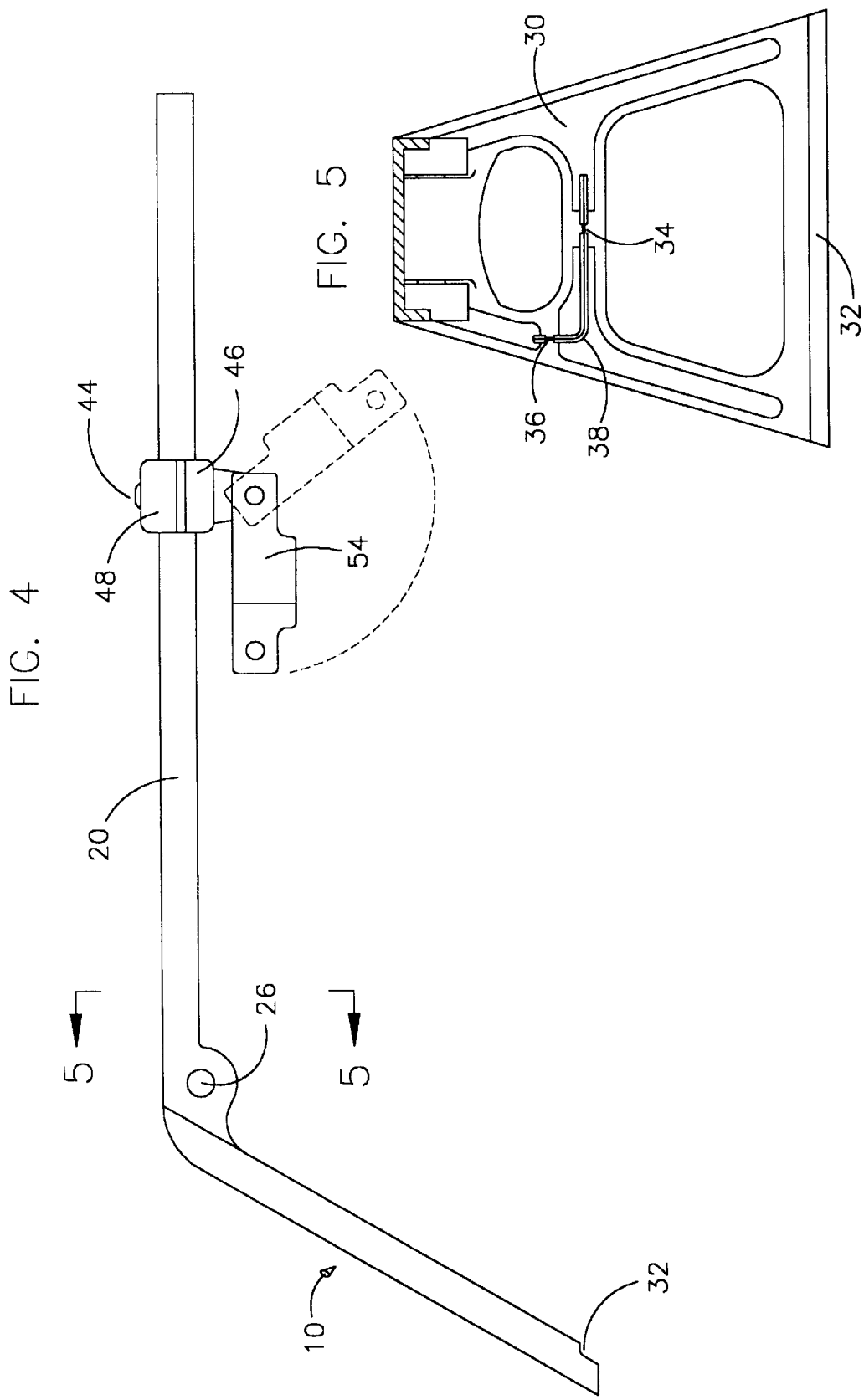

STRING TRIMMER GUARD

BACKGROUND OF THE INVENTION

(1) Field of the Invention

The present invention relates generally to a guard for a string trimmer, and in particular to a pivotal guard that can be attached to existing string trimmers of various designs to prevent damage to flowers, shrubs and other vegetation in front of the trimmer.

(2) Description of the Prior Art

String trimmers are comprised of a rotary cutting head that feeds at least one monofilament line or string of nylon or other plastic. A motor rotates the cutting head at high speed to rotate the string along a generally horizontal, circular pathway. The cutting head is located at the lower end of an elongated handle or shaft, while the motor, which may be electric or gasoline powered, is normally mounted at the top of the handle.

Grass, weeds and other vegetation are readily cut by contact by the rotating string. However, the string can also cause damage to the bark of shrubs and trees, and to flowers and other vegetation that the user desires not to cut. In order to address this problem, various guards have been proposed that can be positioned in front of the rotary path of the string to prevent the string from contacting objects on the opposite side of the guard.

The following patents describe prior art string trimmer guards:

| U.S. Pat. No. | Inventor(s) |
| --- | --- |
| 4,756,084 | Morita |
| 4,872,265 | Powell |
| 4,890,389 | Whitkop |
| 5,048,187 | Ryan |
| 5,060,383 | Ratkiewich |

String trimmers are sold by various manufacturers and are of many different designs. For example, the handle or shaft of some string trimmers is comprised of a generally vertical section adjacent the cutting head curving to join an upper, rear section that is at an angle, e.g., of from about 30 to 60°. Other trimmer handles are generally straight and extend rearwardly from adjacent the cutting head at a 30 to 60° angle. Different string trimmers also are designed with different cutting radiuses. As a result, a different guard design is required for each style of trimmer.

The guard, to be effective, must be positioned at a sufficient distance from the axis of the cutting head to avoid contact with the string. At the same time, spacing of the guard at an unnecessarily great distance from the string pathway minimizes the cutting efficiency of the trimmer by preventing cutting of grass and other matter close to the object to be protected.

In addition, the guard must provide a large barrier surface between the string and the object to be protected, and must be sufficiently rigid to prevent deflection of the guard when an object is contacted with some force. Prior art guards are inadequate in both respects.

Prior art guards have been designed for attachment to a single type of string trimmer, requiring the manufacture and stocking of a variety of trimmer guard designs. A string trimmer guard, in particular a pivotal guard, that could be easily mounted on a string trimmers of different designs, would be of considerable commercial utility.

SUMMARY OF THE INVENTION

The present invention is directed to string trimmers, and in particular to string trimmer guards that can be readily attached to a variety of string trimmer designs. The invention relates especially to pivotal guards that can be mounted on string trimmers with different cutting radiuses, while still having the rigidity required to prevent contact of the rotating string with objects to be protected. The invention also relates particularly to guards that can be attached to string trimmers with different handle angles adjacent the cutting head, while still providing a barrier that is pivotal in front of the string pathway.

Generally, string trimmers to which the guard of the invention is attached are comprised of a rotary cutting head having a line or string reservoir from which string is fed during operation to maintain a string of a desired length that rotates around a circular pathway. The cutting head is attached to the lower end of an elongated shaft or handle.

The trimmer may also have a motor at the upper end of the shaft, with the motor being connected to the cutting head by a drive mechanism extending through the drive shaft. In addition, the cutter may have a guard around and spaced from a part of the rear segment of the string pathway to protect the operator from contacting the rotation string. Also, a handle may be attached to the shaft intermediate its upper and lower ends for use in controlling the positioning of the cutting head. Other known components, such as a string cutter to maintain the desired cutting radius may also be incorporated into the design.

The guard of the present invention is comprised of a barrier, a mounting plate including a front barrier attachment section and a pair of connecting arms with parallel longitudinal axes to be positioned on opposite sides of the shaft, and extend rearwardly from the mounting plate; and a hinge to attach the mounting plate to the cutter shaft above the cutting head.

The barrier is designed to be supported in a generally upright position in front of the trimmer's string pathway at a distance where contact with the string is avoided. The barrier is comprised of an outer face; an inner face; and generally parallel, upper and lower edges. The outer face may be flat or convex. Similarly, the inner face may be flat or concave with a curvature corresponding to a section of the periphery of the string pathway.

The barrier lower edge, which will be adjacent the ground during use, may include a recessed area running along its inner face so that the distal end of the rotating string can be closer to the plate, thus permitting cutting of vegetation closer to an obstacle. The upper edge of the barrier may be integral with the forward edge of the mounting plate, or may be designed to connect to the front of the mounting plate by a hinge or an attachment pin.

The lower edge of the barrier will generally be wider that the upper barrier edge, so that the side edges of the barrier joining the outer ends of the upper and lower edges will expand outwardly toward the lower edge of the barrier. The barrier may also include other features, such as one or more openings between its inner and outer faces to reduce the weight of the guard. Also, a tool holder may be included, for example on the barrier inner surface, to hold a tool for use in attaching or adjusting the guard.

The mounting plate includes a barrier attachment section to attach the upper edge of the barrier to the mounting plate. This barrier attachment section may be formed integrally with the barrier. However, the mounting plate and barrier are preferably formed separately for ease of packaging and shipment. Also, in the event of damage to only the barrier or the mounting plate, it will not be necessary to replace both elements. In this embodiment, the barrier is attached to the mounting plate with some form of attachment element, such as a one or two pins. Also, the upper edge of the barrier can be hinged to the front edge of the mounting plate.

The mounting plate also includes a pair of parallel arms that extend rearwardly from the barrier attachment section. The front ends of these arms are preferably integral with the rear side of the barrier attachment section. For strength and rigidity with minimal weight, each arm is preferably comprised of a horizontal segment and a vertical segment extending downwardly from the horizontal upper segment. For example, the horizontal segments may include outer parallel edges, with the vertical segment having upper edges integral with these outer parallel edges. The arms may include a plurality of spaced locking members, e.g., teeth, to engage the hinge, and thus better secure the hinge to the arms. Alternatively, the arms can be held in position by frictional engagement.

The hinge is specifically designed to provide strength and rigidity to the guard structure, while permitting adjustment of the barrier position to meet the requirements of different string trimmers. Due to the difference in design of various string trimmers, two adjustments may be required. First, the position of the barrier relative to the string pathway must be adjustable, so that the barrier will be positioned close to, but outside, the pathway. Secondly, the barrier must be supported in a generally upright manner with its lower edge adjacent the periphery of the string pathway.

The hinge of the invention, which permits adjustment of both of these parameters, is comprised of an upper clamping member to adjustably secure the hinge to the attachment plate and a lower or shaft clamp to secure the hinge around the trimmer shaft. The upper and lower clamps are pivotally attached to each other.

The upper hinge clamp is preferably comprised of a pair of opposed upper and lower clamp sections adapted to be positioned against the upper and lower surfaces of the attachment plate arms. The clamp sections may be releasibly attached to each other, e.g., by a bolt or other fastener extending through matching bolt holes in each section. The lower clamp section also includes a mounting bracket to attach the upper clamp to the lower hinge clamp. This mounting bracket preferably includes an upper end integral with the lower section of the upper hinge clamp.

The lower shaft clamp is comprised of a pair of opposed sections with facing inner surfaces to be secured to each other on opposite sides of the cutter shaft when the guard is in position for use. The opposed sections include inner ends adapted to be pivotally mounted to the mounting bracket of the upper clamp, e.g. by a bolt or other adjustable fastener extending through matching holes in the mounting bracket and the opposed section upper ends. The inner faces of the sections are preferably concave or inwardly curved to match the curvature of the shaft to which the sections are attached.

The outer ends of the opposed sections are attachable to each other, e.g., by another bolt or other adjustable fastener, so that the lower shaft clamp can be secured around the shaft. The upper fastener can be used to position the upper and lower clamps relative to each other, and one or both of the fasteners can be used to adjust the spacing between the opposed sections, so that the lower clamp can be secured around shafts of different diameter.

When attaching the string trimmer guard of the present invention to a given string trimmer, the lower clamp is secured to the trimmer shaft above the trimmer head by bolting the opposed lower clamp sections to each other around the cutter shaft so that their inner faces engage opposite sides of the shaft. Depending upon the particular trimmer design, the inner end of the lower clamp, and thus the upper clamp, may be positioned either to the rear or front of the cutter shaft. Generally, the inner end of the lower clamp and the upper clamp attached thereto will be positioned to the rear of trimmers with vertical shaft sections adjacent the cutter head, and to the front of trimmers with shaft sections adjacent the cutter head that extend rearwardly.

The barrier is then positioned to the front of the string trimmer at the desired distance in front of the periphery of the string pathway and the arms of the mounting plate are clamped by the upper clamp at the appropriate position along the longitudinal axes of the arms to hold the barrier at the desired distance from the string pathway, e.g., from about 0.5 to about 2 inches.

The upper and lower clamps are secured to each other by tightening the inner ends of the lower clamp sections against the mounting bracket of the upper clamp to hold the attachment plate and the barrier in the desired position with the lower edge of the barrier being aligned with the pathway of the cutter head string. Normally, the lower clamp will be positioned on the trimmer shaft at a position such that the attachment arm is horizontal when the barrier is in the desired position.

When using the string trimmer, the barrier plate will normally be positioned in front of the string pathway. In this position, the plate will engage any object, such as a tree, shrubbery, or flowers, in front of trimmer before the object is intersected by the string pathway, thus preventing injury to the object. In instances where engagement of the string pathway with objects to the front of the trimmer is desired, e.g., when cutting grass or weeds next to a wall or sidewalk, the string trimmer can be tilted to the side and one corner of the barrier can be used as a guide to control the positioning of the string pathway.

Accordingly, one aspect of the present invention is to provide a string trimmer guard for use with a string trimmer having a string feeding rotary cutting head at the end of a shaft to carry a length of string in a circular string pathway, the guard comprising a barrier to be positioned at the front of the pathway; a mounting plate having a front end and a rearwardly an first and second parallel, rearwardly extending attachment arms; a first clamp attachable to the arms; and a shaft clamp to secure the trimmer guard to the shaft of a trimmer, the first clamp and the shaft clamp being pivotally attached to each other.

Yet another aspect of the invention is to provide a string trimmer guard for use with a string trimmer having a string feeding rotary cutting head at the end of a shaft to carry a length of string in a circular string pathway, the guard comprising a barrier to be positioned at the front of the pathway, the barrier having an outer face, an inner face, an upper edge and a lower edge; a mounting plate having a front end and first and second rearwardly extending attachment arms having parallel longitudinal axes; a first clamp attachable to the arms, the first clamp including a first segment positionable above the arms and a second segment positionable beneath the arms, the lower clamp including a downwardly extending shaft clamp attachment bracket; and a shaft clamp to secure the trimmer guard to the shaft of a trimmer, the first clamp including opposed first and second segments to be positioned on opposite sides of the shaft and attachable to each other, the shaft clamp being pivotally to the shaft clamp attachment bracket.

Still another aspect of the invention is to provide an improved string trimmer comprised of an elongated shaft having a lower section with a lower end; a rotary cutting head mounted at the lower end of the shaft to carry a string along a horizontal circular pathway having an outer periphery; a front guard mounted on the shaft adjacent the cutting head, the guard including a generally upright barrier at the front of the trimmer; an attachment plate including a pair of parallel support arms extending rearwardly from the plate and on opposite sides of the shaft, the attachment plate being joined to the barrier; a first clamp attached to the arms; and a shaft clamp attached to the shaft, the first clamp and the shaft clamp being pivotally attached to each other.

These and other aspects of the present invention will become apparent to those skilled in the art after a reading of the following description of the preferred embodiment.

BRIEF DESCRIPTION OF THE DRAWINGS

FIG. 4 is a side view of the trimmer guard, show two possible positions of the lower clamp.

FIG. 5 is a view of the rear face of the trimmer guard barrier showing mounting of a tool.

DETAILED DESCRIPTION OF THE INVENTION

In the following description, terms such as horizontal, upright, vertical, above, below, beneath, front, rear, and the like, are used solely for the purpose of clarity in illustrating the invention, and should not be taken as words of limitation. The drawings are for the purpose of illustrating the invention and are not intended to be to scale.

Figure 1:
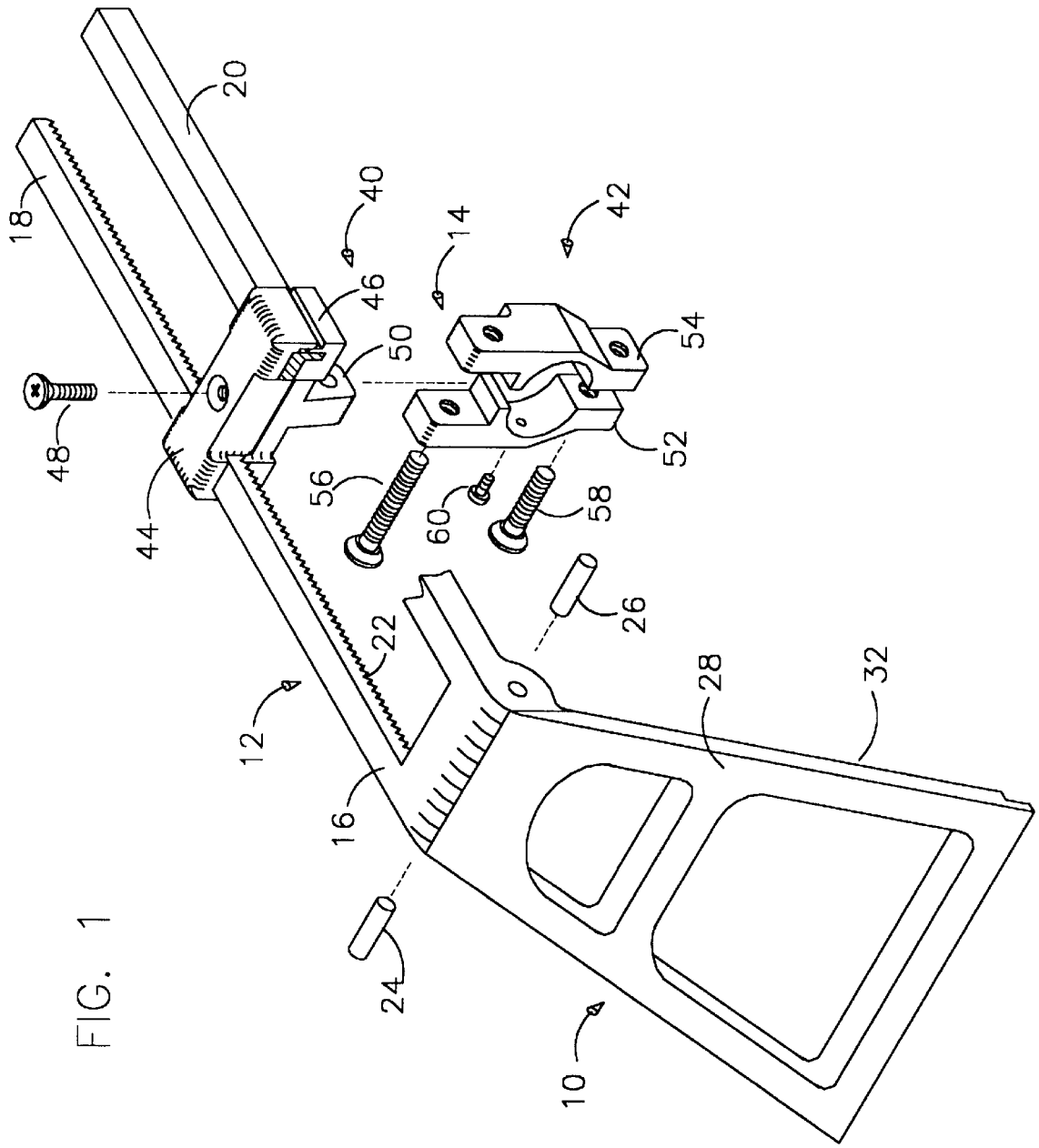
FIG. 1 is an exploded perspective view of the trimmer guard.

As best illustrated in the exploded, perspective view of FIG. 1, the trimmer guard of the present invention is comprised of a barrier, generally 10; a mounting plate, generally 12, and a hinge, generally 14.

Mounting plate 12 includes barrier attachment section 16 and parallel arms 18 and 20 spaced at a distance equal to the diameter of the largest trimmer shaft to which the guard will be attached. Teeth 22 may be present on arms 18 and 20 for use in securing hinge 14 in the desired position. Barrier 10 is attached in a generally upright position to barrier attachment section 16 with attachment pins 24 and 26.

Barrier 10 includes an outer face 28, and an inner face 30. A string receiving recess 32 is located at the lower edge of inner face 30 in a plane with the pathway of the trimmer string. Integrally formed mounting clips 34 and 36 hold a tool 38, e.g., an Allen wrench, for use in fitting and adjusting the guard on the trimmer shaft.

Hinge 14 includes an upper clamp, generally 40, to be attached to arms 18 and 20, and a lower clamp, generally 42, to be attached to the shaft of a trimmer. Clamps 40 and 42 are pivotally attachable to each other.

Upper clamp 40 is comprised of an first and second upper clamp sections 44 and 46, respectively, to be positioned at the desired position along the longitudinal axes of attachment arms 18 and 20. Clamp sections 44 and 46 may be attached to each other with adjustable fastener 48. Clamp section 46 includes downwardly extending mounting bracket 50, used to attach lower clamp 42 to upper clamp 40.

Lower clamp 42 is comprised of first and second opposed lower clamp sections 52 and 54 to be secured to each other on opposite sides of a trimmer shaft, and at their inner ends to mounting bracket 50. Allen bolts 56 and 58 are used to adjustably and releasibly secure sections 52 and 54 to each other. Set screw 60 extends through the wall of section 52, and can be threaded inwardly into contact with a trimmer shaft as an additional means of securing the trimmer shaft in position.

Figure 2:
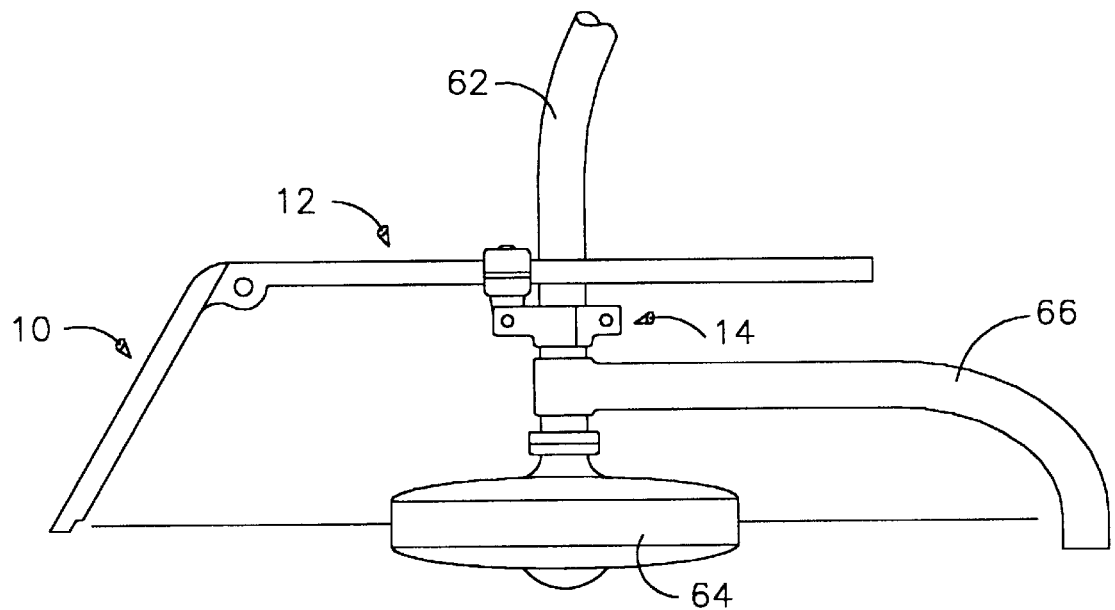
FIG. 2 is side view of the guard attached to a trimmer with a generally vertical handle section adjacent the cutting head.
Figure 3:
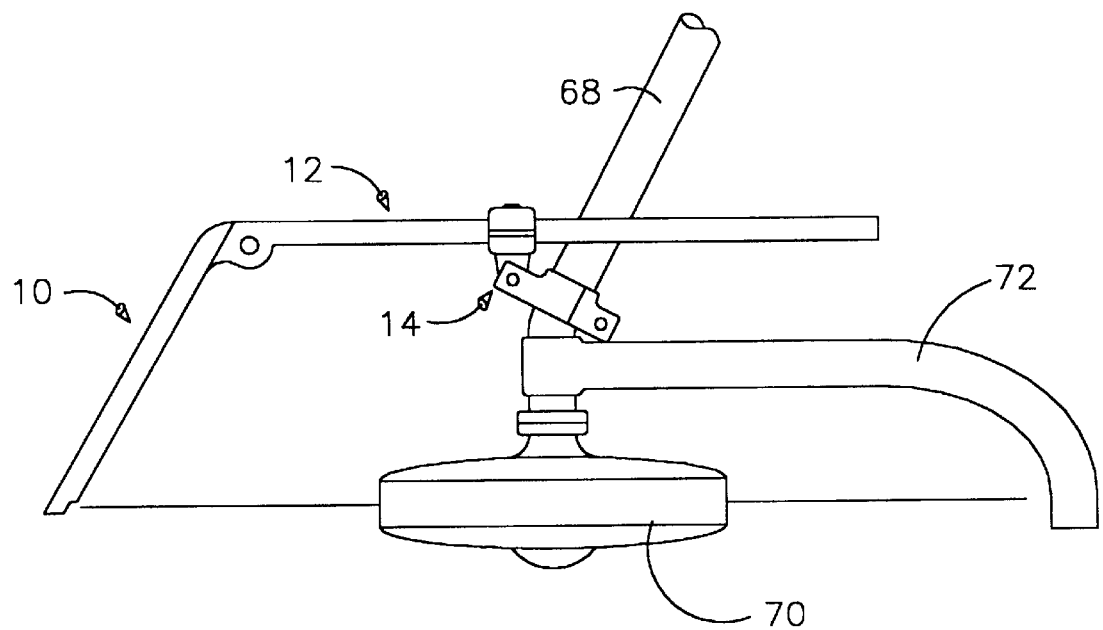
FIG. 3 is side view of the guard attached to a trimmer with an angular handle section adjacent the cutting head.

As shown in FIGS. 2 and 3, the string trimmer guard can be attached to various designs of string trimmers. In FIG. 2, the inner end of lower clamp 42 and attached upper clamp 44 are clamped to a first trimmer construction in which the lower section of shaft 62 adjacent cutter head 64 is vertical. Barrier 10 is to the front of shaft 62, while a conventional guard 66 is positioned to the rear of shaft 62.

In FIG. 3, illustrates a trimmer in which the lower section of shaft 68 is inclined toward the rear. Barrier 10 is positioned to the front of the string trimmer at the desired distance from the string pathway and arms 18 and 20 are clamped at the desired position in upper clamp 40. This trimmer similarly includes a cutter head 70 and a rear guard 72.

Thus, by providing a first clamp for adjusting the distance of barrier 10 from the string pathway, and a second clamp for attaching the guard to the trimmer shaft, and pivotally connecting the clamps to each other, the guard can be mounted on a variety of trimmers with barrier 10 at the desired location. If desired, however, barrier 10 can be easily moved from in front of the string pathway by temporarily loosening the connection between upper and lower clamps 40 and 42 and pivoting barrier 10 and plate 12 upward. Clamps 40 and 42 are then locked to each other to hold barrier 10 in the upper position.

Certain modifications and improvements will occur to those skilled in the art upon a reading of the foregoing description. It should be understood that all such modifications and improvements have been deleted herein for the sake of conciseness and readability but are properly within the scope of the follow claims.

What is claimed is:

1. A string trimmer guard for use with a string trimmer having a shaft and a string feeding rotary cutting head at the end of said shaft to carry a length of string in a circular string pathway, said shaft having a given diameter, said guard comprising:

a) a barrier to be positioned at the front of said pathway, said barrier having an outer face, an inner face, an upper edge and a lower edge;

b) a mounting plate having a front end and first and second spaced, parallel, attachment arms extending rearwardly from said front end, said arms being spaced at a distance at least equal to said given diameter, whereby said first and second arms may be positioned on opposite sides of said shaft;

c) a first clamp attachable to said arms, said arms being longitudinally adjustable relative to said first clamp; and d) a shaft clamp to secure said trimmer guard to the shaft of a trimmer, said first clamp and said shaft clamp being pivotally attached to each other.

2. The string trimmer guard of claim 1, wherein said first clamp includes first and second segments to be positioned at opposite sides of said arms, said arms being longitudinally adjustable relative to said segments.

3. The string trimmer guard of claim 1, wherein said first clamp includes a downwardly extending mounting bracket, said shaft clamp being pivotally attached to said mounting bracket.

4. The string trimmer guard of claim 1, wherein said shaft clamp is comprised of opposed first and second segments to be positioned on opposite sides of said shaft, said segments being attachable to each other.

5. The string trimmer guard of claim 4, further including a set screw extending inwardly through one of said segments.

6. The string trimmer guard of claim 1, wherein said shaft bracket is comprised of first and second opposed segments to be positioned on opposite sides of said shaft, and attached to each other.

7. The string trimmer guard of claim 1, wherein said arms include locking members along their longitudinal axes, said locking members being selectively engageable with said first clamp.

8. The string trimmer guard of claim 1, wherein said barrier includes a lower edge, said lower edge including a string recess.

9. The string trimmer guard of claim 1, wherein said barrier includes an inner face, said inner face include tool mounting clips.

10. The string trimmer guard of claim 1, wherein said barrier is releasibly attached to the front end of said mounting plate.

11. A string trimmer guard for use with a string trimmer having a shaft and a string feeding rotary cutting head at the end of said shaft to carry a length of string in a circular string pathway, said shaft having a given diameter, said guard comprising:

a) a barrier to be positioned at the front of said pathway, said barrier having an outer face, an inner face, an upper edge and a lower edge;

b) a mounting plate having a front end and first and second spaced, attachment arms having parallel longitudinal axes with front ends attached to the upper edge of said barrier, said attachment arms extending rearwardly from said front end, and being spaced at a distance at least equal to said given diameter, whereby said first and second arms may be positioned on opposite sides of said shaft;

c) a first clamp attachable to said arms, said first clamp including a first segment positionable above said arms and a second segment positionable beneath said arms, said lower clamp including a downwardly extending shaft clamp attachment bracket, said arms being longitudinally adjustable relative to said first clamp; and d) a shaft clamp to secure said trimmer guard to the shaft of a trimmer, said shaft clamp including opposed first and second segments to be positioned on opposite sides of said shaft and attachable to each other, said shaft clamp being pivotally attached to said shaft clamp attachment bracket.

12. An improved string trimmer comprised of:

a) an elongated shaft having a lower section with a given diameter and a lower end;

b) a rotary cutting head mounted at the lower end of said shaft to carry a string along a horizontal circular pathway having an outer periphery;

c) a front guard mounted on said shaft adjacent said cutting head, said guard including a generally upright barrier at the front of said trimmer; a mounting plate including a pair of spaced, parallel support arms extending rearwardly from said plate and on opposite sides of said shaft, said arms being spaced at a distance at least equal to said given diameter, said mounting plate being joined to said barrier; a first clamp attached to said arms, said arms being longitudinally adjustable relative to said first clamp; and a shaft clamp attached to said shaft, said first clamp and said shaft clamp being releasibly attached to each other.

13. The string trimmer of claim 12, wherein the lower section of said shaft is generally vertical and said first clamp is mounted behind said shaft.

14. The string trimmer of claim 12, wherein the lower section of said shaft is rearwardly inclined and said first clamp is mounted in front of said shaft.

15. The string trimmer of claim 12, wherein said shaft has a circular cross-section, and said shaft clamp included opposed segments on either side of said shaft, said clamp segments having concave inner faces corresponding to the curvature of said shaft and engaging said shaft.

16. The string trimmer of claim 12, further including a rear guard attached to said shaft and extending behind said string pathway.

17. The string trimmer of claim 12, wherein said arms include locking members along their longitudinal axes, said locking members being selectively engageable with said first clamp.

18. The string trimmer of claim 12, wherein said barrier includes a lower edge having a string recess in a plane with said string pathway.

19. The string trimmer of claim 12, wherein said barrier includes an inner face, said inner face including tool mounting clips.

20. The string trimmer of claim 12, wherein said barrier is releasibly attached to the front end of said mounting plate.

* * * * *